United States Patent
Kiss et al.

(10) Patent No.: US 8,085,746 B2
(45) Date of Patent: *Dec. 27, 2011

(54) SYSTEM AND METHOD FOR PUSHING CONTENT TO A TERMINAL UTILIZING A NETWORK-INITIATED DATA SERVICE TECHNIQUE

(75) Inventors: Krisztian Kiss, San Diego, CA (US); Sarvesh Asthana, San Diego, CA (US)

(73) Assignee: Core Wireless Licensing S.a.r.l., Luxembourg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/707,503

(22) Filed: Feb. 17, 2010

(65) Prior Publication Data
US 2010/0211660 A1    Aug. 19, 2010

Related U.S. Application Data

(63) Continuation of application No. 10/797,491, filed on Mar. 10, 2004.

(51) Int. Cl.
*H04W 4/00* (2009.01)
*G06F 15/16* (2006.01)
(52) U.S. Cl. ............. 370/338; 455/435.1; 709/228
(58) Field of Classification Search .......... 370/328, 370/338; 709/221, 228; 455/435.1
See application file for complete search history.

(56) References Cited

U.S. PATENT DOCUMENTS

| | | | |
|---|---|---|---|
| 6,393,488 B1 * | 5/2002 | Araujo | 709/245 |
| 6,618,757 B1 | 9/2003 | Babbitt et al. | |
| 6,636,491 B1 | 10/2003 | Kari et al. | |
| 6,690,407 B1 | 2/2004 | Parker et al. | |
| 6,910,074 B1 | 6/2005 | Amin et al. | |
| 6,961,575 B2 | 11/2005 | Stanforth | |
| 7,072,332 B2 | 7/2006 | D'Souza | |
| 7,072,933 B1 * | 7/2006 | Lamb et al. | 709/203 |
| 7,089,328 B1 * | 8/2006 | O'Rourke et al. | 709/245 |
| 7,142,843 B2 | 11/2006 | Dowling et al. | |

(Continued)

FOREIGN PATENT DOCUMENTS

JP    2003179603 (A)    6/2003

(Continued)

OTHER PUBLICATIONS

3GPP TR 23.974 V2.0.0, 3rd Generation Partnership Project; Techical Specification Group Services and System Aspects; Support of Push Service (Release 5). pp. 1-7.

(Continued)

*Primary Examiner* — Christopher M Brandt
(74) *Attorney, Agent, or Firm* — Ditthavong Mori & Steiner, P.C.

(57) ABSTRACT

A system is provided for pushing content to a terminal located within a mobile network or a private network. The system includes a network node, such as a Session Initiation Protocol (SIP) proxy, located across a public network from the network including the terminal. The network node is capable of subscribing to a push service on behalf of the terminal such that the network node is also capable of receiving push content in accordance with the push service. Thereafter, the network node is capable of establishing a network-initiated data session with the terminal. In response to the network-initiated data session, the network node is further capable of registering the terminal such that the terminal is capable of receiving the push content based upon the registration.

17 Claims, 4 Drawing Sheets

U.S. PATENT DOCUMENTS

| | | | |
|---|---|---|---|
| 7,177,636 | B2 | 2/2007 | Oda et al. |
| 7,260,649 | B1* | 8/2007 | Somasundaram et al. ..... 709/245 |
| 7,313,145 | B1* | 12/2007 | Bradd et al. ................ 370/401 |
| 2001/0005675 | A1 | 6/2001 | Aho |
| 2001/0034767 | A1 | 10/2001 | Aho |
| 2001/0036834 | A1* | 11/2001 | Das et al. ...................... 455/458 |
| 2002/0058504 | A1 | 5/2002 | Stanforth |
| 2002/0116607 | A1* | 8/2002 | Boies et al. ................... 713/153 |
| 2002/0126701 | A1 | 9/2002 | Requena |
| 2002/0138622 | A1 | 9/2002 | Dorenbosch et al. |
| 2002/0152325 | A1* | 10/2002 | Elgebaly et al. .............. 709/246 |
| 2002/0196782 | A1 | 12/2002 | Furukawa et al. |
| 2003/0040280 | A1* | 2/2003 | Koskelainen ................. 455/67.1 |
| 2003/0058839 | A1 | 3/2003 | D'Souza |
| 2003/0058874 | A1 | 3/2003 | Sahaya et al. |
| 2003/0112793 | A1 | 6/2003 | Sengodan |
| 2003/0154293 | A1 | 8/2003 | Zolek |
| 2003/0165121 | A1* | 9/2003 | Leung et al. .................. 370/313 |
| 2003/0167340 | A1* | 9/2003 | Jonsson ........................ 709/238 |
| 2003/0193921 | A1* | 10/2003 | Kim .............................. 370/338 |
| 2003/0206536 | A1 | 11/2003 | Maggeti |
| 2004/0001509 | A1* | 1/2004 | Zhang et al. .................. 370/466 |
| 2004/0003058 | A1 | 1/2004 | Trossen |
| 2004/0024879 | A1 | 2/2004 | Dingman et al. |
| 2004/0039820 | A1* | 2/2004 | Colby et al. .................. 709/226 |
| 2004/0044777 | A1 | 3/2004 | Alkhatib et al. |
| 2004/0106408 | A1* | 6/2004 | Beasley et al. ................ 455/436 |
| 2004/0133692 | A1* | 7/2004 | Blanchet et al. ............. 709/230 |
| 2004/0139228 | A1* | 7/2004 | Takeda et al. ................. 709/245 |
| 2004/0190549 | A1* | 9/2004 | Huitema ....................... 370/466 |
| 2004/0203760 | A1* | 10/2004 | Zhang ............................ 455/433 |
| 2004/0233916 | A1* | 11/2004 | Takeuchi et al. ......... 370/395.54 |
| 2004/0252683 | A1* | 12/2004 | Kennedy et al. .............. 370/389 |
| 2005/0021762 | A1* | 1/2005 | Gbadegesin .................. 709/227 |
| 2005/0076141 | A1* | 4/2005 | Williams et al. ............. 709/245 |
| 2005/0117595 | A1 | 6/2005 | El-Beik et al. |
| 2005/0177647 | A1* | 8/2005 | Anantha et al. ............... 709/249 |
| 2005/0188406 | A1 | 8/2005 | Gielow et al. |
| 2006/0025141 | A1 | 2/2006 | Marsh et al. |
| 2007/0113269 | A1* | 5/2007 | Zhang ............................... 726/4 |
| 2008/0153500 | A1 | 6/2008 | Zhao et al. |

FOREIGN PATENT DOCUMENTS

| | | |
|---|---|---|
| WO | WO 02/09387 A1 | 1/2002 |
| WO | WO 02/19749 A1 | 3/2002 |
| WO | WO 02/067533 A1 | 8/2002 |
| WO | WO 03/019918 A1 | 3/2003 |
| WO | WO 03/088625 A1 | 10/2003 |

OTHER PUBLICATIONS

3rd Generation Partnership Project; Technical Specification Group Services and System Aspects; Support of Push service (Release 5); 3GPP TM; 3GPP TR 23,974 V2.0.0; Sep. 2001; pp. 40-50; 3GPP Organizational Partners.

3rd Generation Partnership Project; Technical Specification Group Services and System Aspects; 1P Media Subsystem (IMS); Stage 2 (Release 5); 3GPP TM; 3GPP TS 23.228 V5.11.0; 2003; 128 pages; 3GPP Organizational Partners (ARIB, CCSA, ETSI, TI, TTA, TTC).

International Search Report for corresponding International Application No. PCT/IB2005/000576 dated Aug. 31, 2006, pp. 1-5.

J Rosenberg, H. Schulzrinne, G. Camarillo, A. Johnston, J. Peterson, R. Sparks, M. Handley, E. Schooler; SIP: Session Initiation Protocol; Jun. 2002; 202 pages; RFC 3261; The Internet Society (2002).

Japanese Office Action for Corresponding Japanese Application No. 2007-502432, dated Jul. 21, 2009, Japan, pp. 1-8.

Kuroki, "A Study on Control Method of a Firewall Function in SIP Application Level Gateway (SIP-ALG)", IEICE Technical Report, vol. 102, No. 691, pp. 105-108, Feb. 27, 2003. English Abstract Incl.

Matt Smith, Ray Hunt; Network Security using NAT and NAPT; 2002; 16 pages.

Network Initiated Data Session (NIDS)—Stage 1 Requirements; 2003; 10 pages; 3GPP2.P0090-0, Version 0.2; S10-20030512-008; San Diego, California.

Office Action of Corresponding Chinese Application 200580001281.1 dated Feb. 5, 2010, China, pp. 1-8.

Office Action of Corresponding Chinese Application 200580001281.1 dated Jun. 19, 2009, China. pp. 1-16.

P. Srisuresh; Traditional IP Network Address Translator (Traditional NAT); Jan. 2001; 15 pages; REC 3022; The Internet Society (2001); available at <http://www.ietf.org/rfc/rfc3022.txt?number=3022> (visited Nov. 20, 2003).

Suzuki, "Study on Mobile IP Applied Network Services for Enterprise User", IEICE Technical Report, vol. 102, No. 692, pp. 315-318, Feb. 28, 2003. English Abstract Incl.

European Office action for corresponding EP application No. 05 708 681.1-2413 dated Jun. 15, 2007, pp. 1-3.

European Office action for corresponding EP application No. 05 708 681.1-2413 dated Nov. 29, 2010, pp. 1-4.

International preliminary report on patentability for corresponding international application No. PCT/IB2005/000576 dated Oct. 18, 2006, pp. 1-7.

International search report and written opinion for corresponding international application No. PCT/IB2005/000576 dated Aug. 31, 2006, pp. 1-9.

Office action for related U.S. Appl. No. 10/797,491 dated Sep. 20, 2010, pp. 1-14.

Chinese Office Action of Corresponding CN Application 200580001281.1 dated Mar. 16, 2011, China. pp. 1-7.

Office action for related U.S. Appl. No. 10/797,491 dated Mar. 1, 2011, pp. 1-11.

\* cited by examiner

SYSTEM AND METHOD FOR PUSHING CONTENT TO A TERMINAL UTILIZING A NETWORK-INITIATED DATA SERVICE TECHNIQUE

RELATED APPLICATIONS

This application is a continuation of U.S. patent application Ser. No. 10/797,491 filed on Mar. 10, 2004, the entirety of which is incorporated herein by reference.

FIELD OF THE INVENTION

The present invention generally relates to systems and methods for pushing content to a terminal and, more particularly, to pushing content to a terminal utilizing both a network-initiated data session technique and the Session Initiation Protocol (SIP).

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. The proliferation of local, regional, and global networks such as the Internet has availed a sea of information to society. These networking technologies have expanded to increasingly include wireless and mobile technologies. Through these networks, information can be downloaded to desktop systems, wireless systems, mobile systems, etc. For example, information available via the Internet can now be downloaded onto mobile wireless units, such as cellular telephones, personal digital assistants (PDAs), laptop computers, etc.

Second generation wireless service, often referred to as 2G wireless service, is a current wireless service based on circuit-switched technology. In this regard, 2G systems, such as Global System for Mobile communications (GSM), use digital radio technology for improved quality and a broader range of services over first generation mobile technologies. Third generation wireless service, often referred to as 3G wireless service, refers to a set of digital technologies that promises improvements in capacity, speed and efficiency by deploying new packet-based transmission methodologies between terminals and the network. Users of 3G devices and networks will have access to multimedia services such as video-on-demand, video conferencing, fast web access and file transfer. Existing and future services are, and will continue to be, provided by network service operators who make services and applications available to mobile device users via the network.

One particular service feature currently available for communicating information is a "push" feature (also known as a "notification" feature or "alert" feature). In a typical client/server model, a client requests a service or information from a server, which then responds in transmitting information to the client. This is generally referred to as "pull" technology, where the client pulls the information from the server. For example, entry of a Uniform Resource Locator (URL) at a client device which is then dispatched to the server to retrieve the associated information is a pull transaction.

In contrast, "push" technology generally refers to a means to transmit information to one or more devices without a previous user action. Thus, there is no explicit request from the client before the server transmits its information, and therefore push technology essentially includes server-initiated transactions. Push technologies can be used in connection with various protocols and communication technologies. For example, some representative push technologies include Short Message Service (SMS), Wireless Application Protocol (WAP) Push, Multimedia Messaging Service (MMS), Session Initiation Protocol (SIP), as well as others.

Whereas traditional push technologies are adequate to push content to clients, such technologies suffer from drawbacks. Consider a private network comprising, connected to or otherwise associated with a mobile network, such as a General Packet Radio Service (GPRS) network. In such instances, a client, such as a mobile terminal, communicating across the mobile network can generally initiate a communication session (e.g., SIP communication session) with a server across a Network Address Translator (NAT) located between the client and the server, such as in accordance with "pull" techniques. As will be appreciated, the NAT can translate a private IP address of the client to a public IP address recognizable to the server. A server typically cannot, however, initiate a similar communication session with the client across the NAT, such as in accordance with "push" techniques. In this regard, clients within private and cellular networks typically lack a static and public identity like a fixed IP-address, and as such, servers often cannot identify a desired client to the NAT.

Mobile networks are typically configured in a manner that prevents a server from initiating a SIP communication session with a respective client for a number of reasons. Firstly, depending upon the network topology, enabling IP-connectivity to clients within the network can consume an undesirable amount of resources or reduce performance of the network even when there is no IP-traffic across the network. Secondly, in the network, as in many private networks, there may be more clients than available IP-addresses. As such, the network may include a NAT, dynamically allocated IP addresses and/or private IP addresses. Thirdly, the security needs and policies of many networks require that various IP-traffic be prevented from passing into the network. Such an instance also often leads to the use of the NAT, particularly when the mobile networks include an associated firewall/gateway.

To overcome the drawback of the NAT to permit servers to initiate a communication session with a client in accordance with "push" techniques, networks can be configured such that each client has a unique, fixed IP address, where those addresses are entered into a respective Domain Name System (DNS) server. The NAT and any security components (e.g., firewall/gateway, etc.) of the network can also be configured to allow a server to initiate a communication session with a client and allow routing of traffic to and from the IP address allocated to the client. In addition, for example, network technology-specific resources required for IP connectivity with each client in the network can be allocated when the client is connected to the network.

Such a technique for permitting servers to push content to clients, however, ignores the limitations of public networks that lead to the use of NAT components. Namely, such a technique ignores the limitation of available public IP addresses. Also, such a technique ignores the ability of NAT components to communicate with firewalls/gateways, which provide security functionality. Thus, it would be desirable to design a system capable of permitting servers to push content to clients in a mobile or private network utilizing a network-initiated communication session technique that accounts for the limited address space of public networks and maintains firewall and/or gateway functionality to the respective network.

SUMMARY OF THE INVENTION

In light of the foregoing background, embodiments of the present invention provide an improved system and method for pushing content to a terminal, typically a mobile terminal having an associated private IP address, utilizing a network-initiated data session technique. In contrast to conventional techniques for pushing content to a terminal, embodiments of the present invention permit a network-initiated data session to be established with the terminal from a network node across a public network from the terminal. More particularly, embodiments of the present invention permit network nodes to establish a network-initiated data session with the terminal in a manner that accounts for the limited number of available public IP addresses, and maintains firewall and/or gateway functionality to the mobile network including the terminal.

According to one aspect of the present invention, a system is provided for pushing content to a terminal located within a mobile network or a private network. The system includes a network node, such as a Session Initiation Protocol (SIP) proxy, located across a public network from the network including the terminal. The network node is capable of subscribing to a push service on behalf of the terminal such that the network node is also capable of receiving push content in accordance with the push service. Thereafter, the network node is capable of establishing a network-initiated data session with the terminal. For example, the network node can be capable of sending a trigger to the terminal independent of the public network to thereby trigger the terminal to register with the network node and establish the network-initiated data session. In response to the network-initiated data session, the network node is further capable of registering the terminal such that the terminal is capable of receiving the push content based upon the registration.

More particularly, the network node can be capable of receiving, and thereafter storing in a buffer, the push content. In such instances, the network node can be capable of sending the push content to the terminal from the buffer. Alternatively, the network node can be capable of registering the terminal such that the terminal is capable of subscribing to the push service based upon the registration. In such instances, the terminal can be capable of receiving the push content based upon the terminal subscribing to the push service.

The network node can be capable of receiving a registration message from the terminal across the public network to thereby identify the terminal across the public network and register the terminal. For example, the network node can be capable of receiving the registration message from the terminal via a network address translator (NAT) and/or a firewall (FW) located between the network node and the terminal. In such instances, the network node can be capable of establishing a network-initiated data session in a manner independent of the NAT and/or FW. The network node can additionally or alternatively be capable of registering the terminal such that the terminal is capable of receiving the push content based upon the identity of the terminal across the public network.

According to other aspects of the present invention, a terminal and method for pushing content to a terminal are provided. Therefore, embodiments of the present invention provide an improved system and method for pushing content to a terminal utilizing a network-initiated data session technique. Embodiments of the present invention permit a terminal (i.e., terminating node) to subscribe to, and thereafter receive content from, a push service without requiring additional, or many additional, public IP addresses. Embodiments of the present invention further permit the network node to establish a network-initiated data session with the terminal without obviating firewall and/or gateway functionality otherwise provided to a mobile network including the terminal, such as by a FW. Therefore, the system and method of embodiments of the present invention solve the problems identified by prior techniques and provide additional advantages.

BRIEF DESCRIPTION OF THE DRAWINGS

Figure 1:
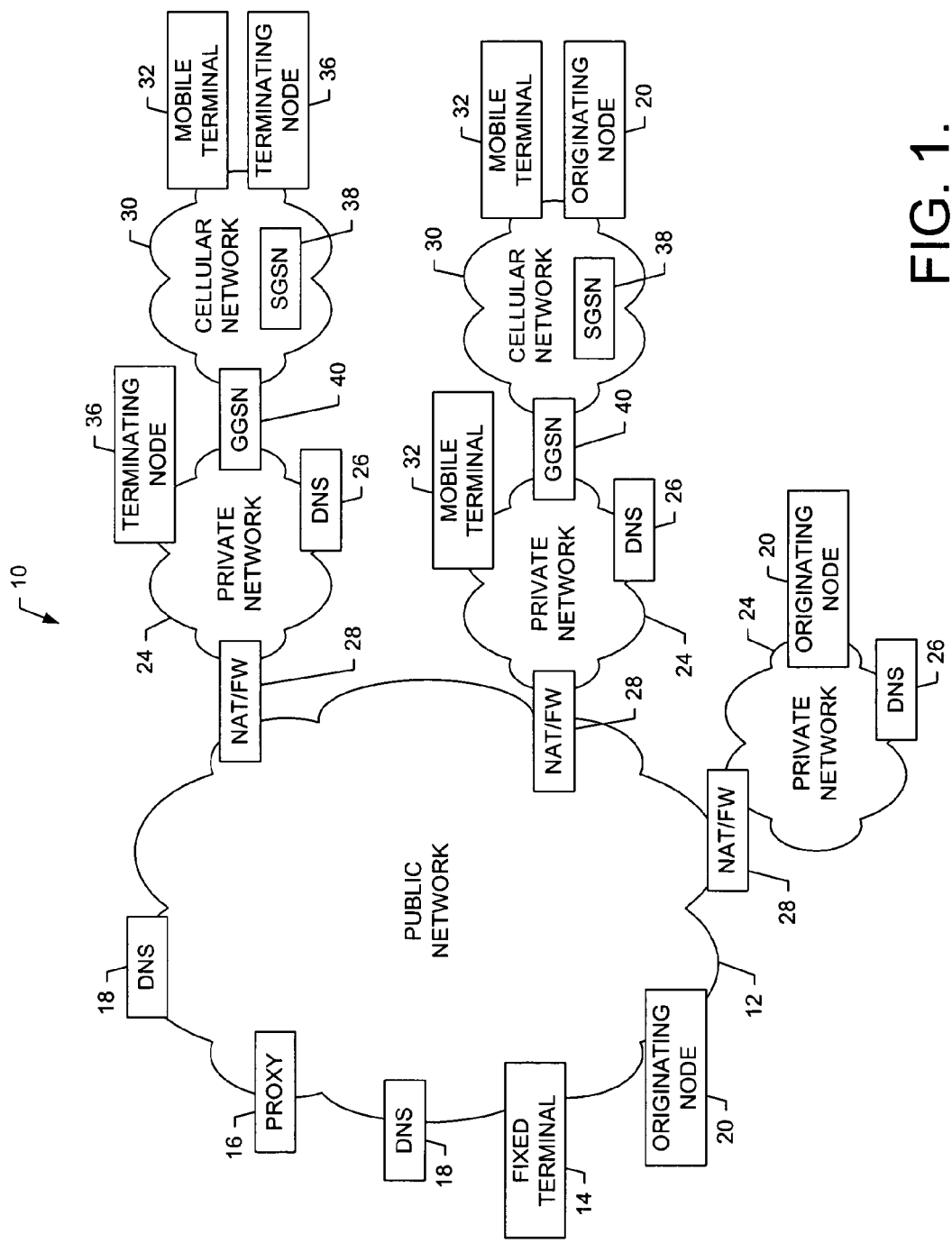
Figure 2:
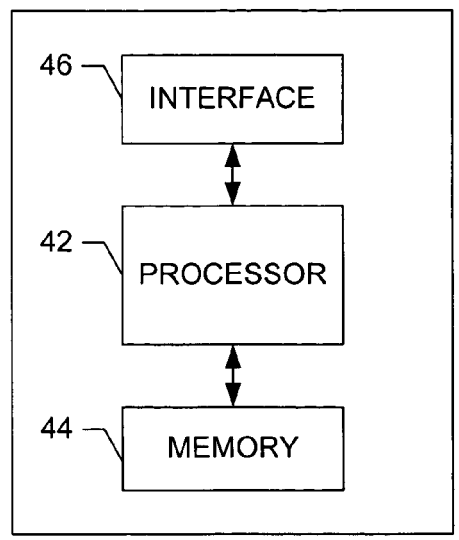
Figure 3:
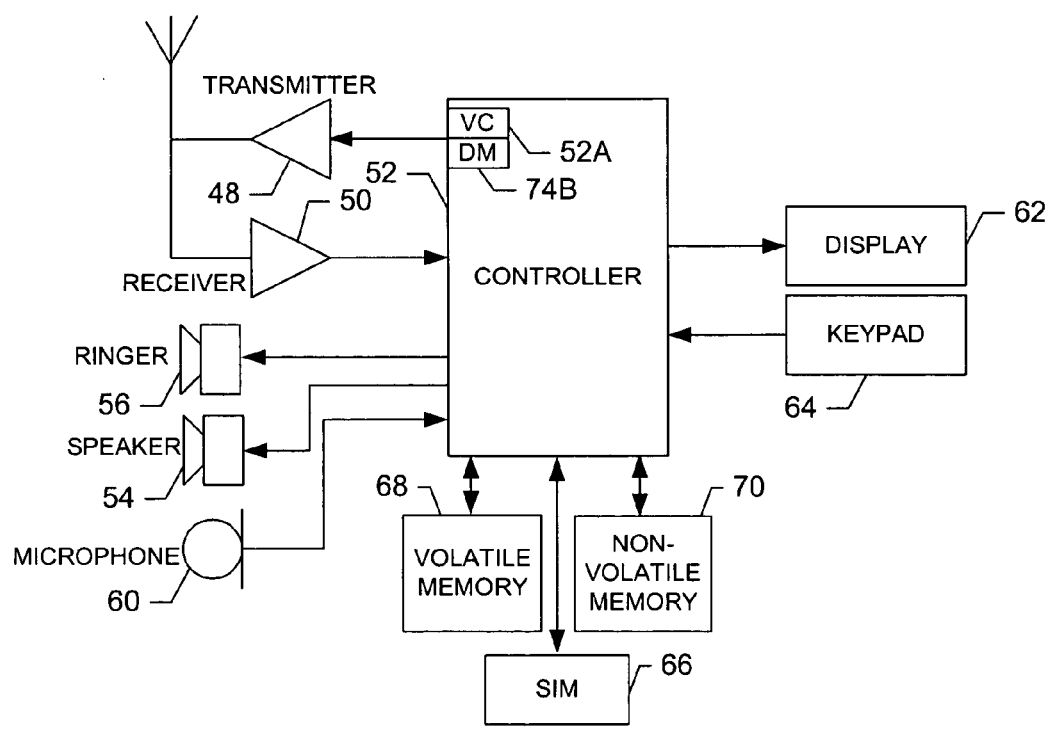
Figure 4A:
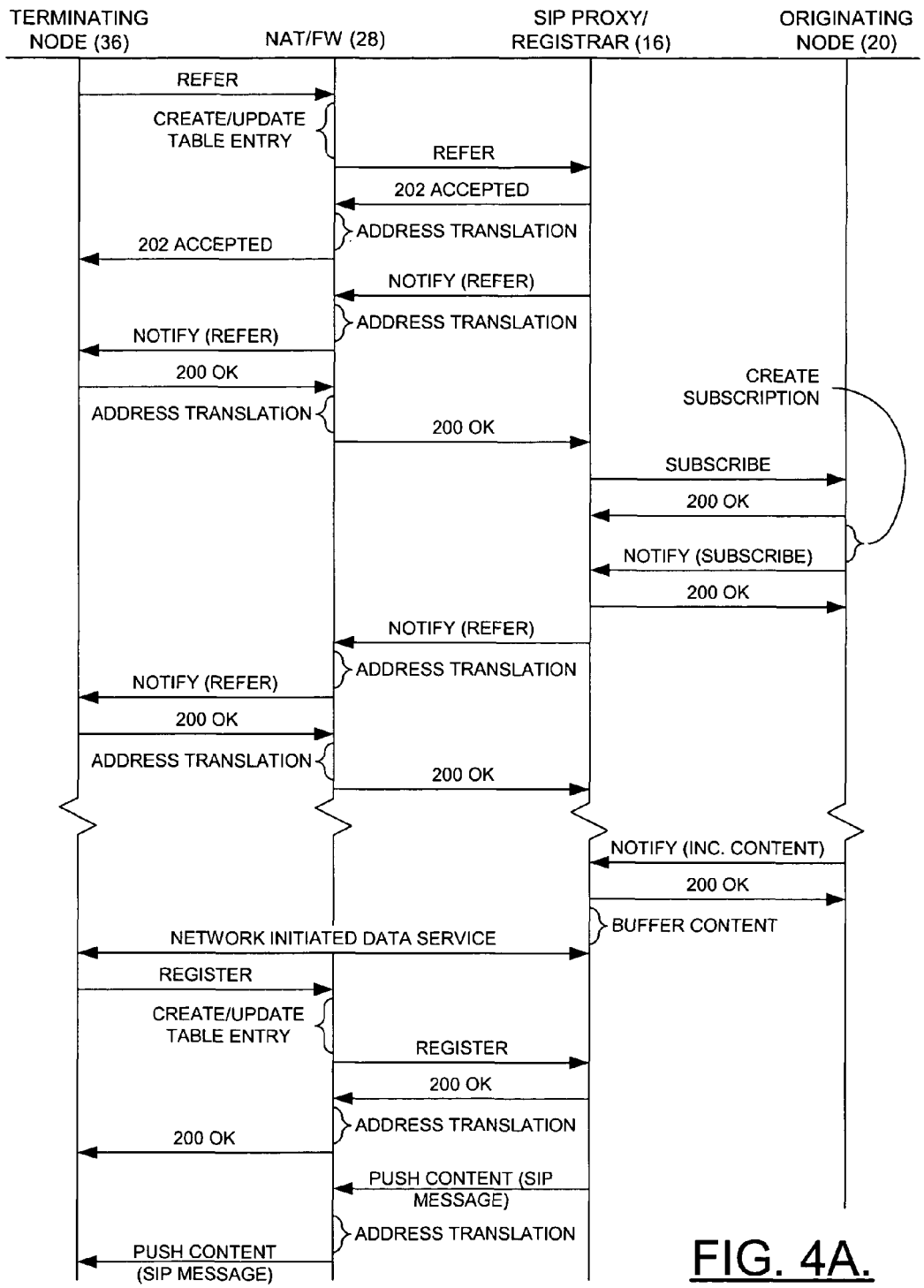
Figure 4B:
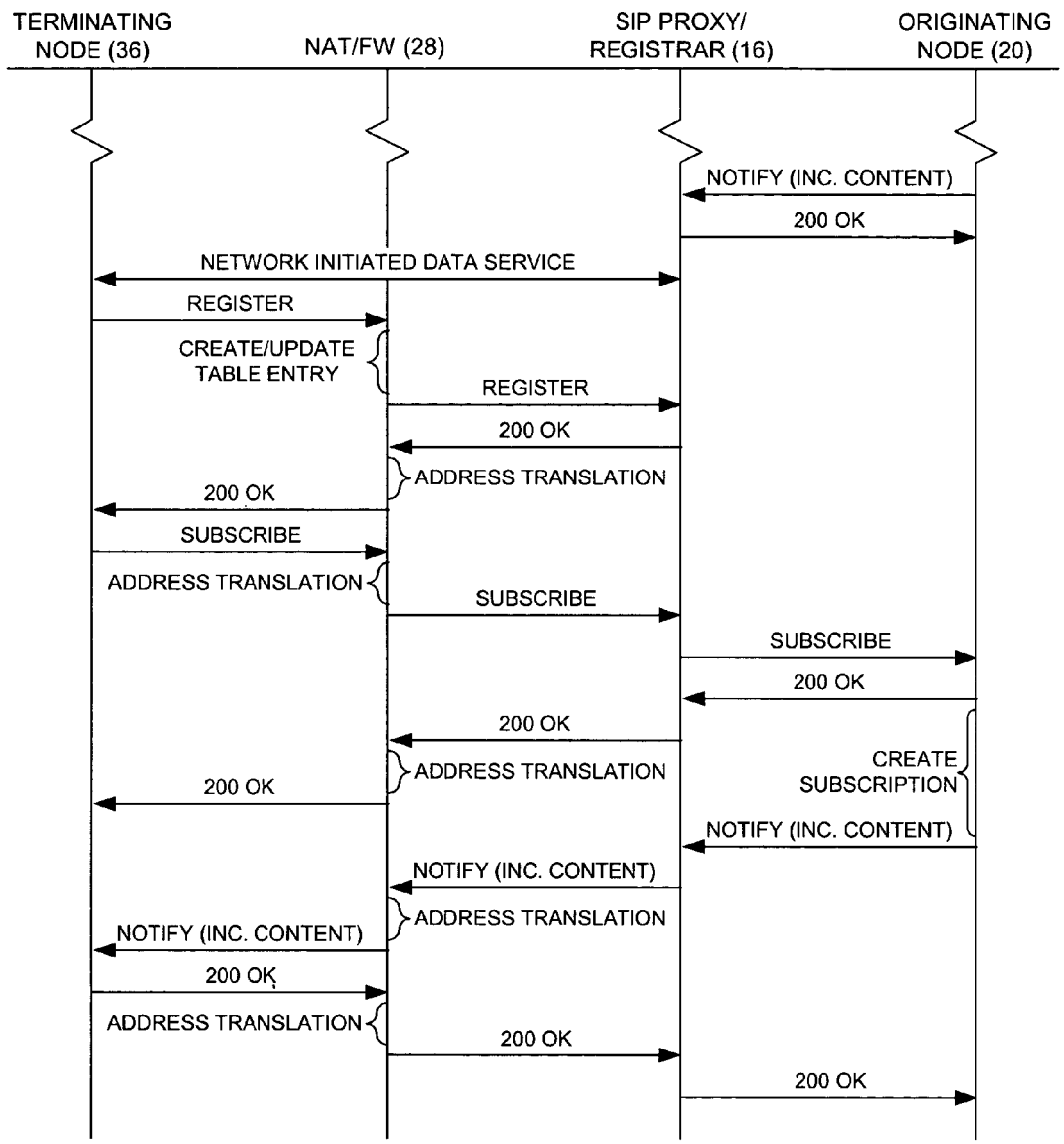

Having thus described the invention in general terms, reference will now be made to the accompanying drawings, which are not necessarily drawn to scale, and wherein:

FIG. 1 is a schematic block diagram of a communications system according to one embodiment of the present invention including a public network and a mobile network to which an originating node and a terminating node are bi-directionally coupled directly or indirectly;

FIG. 2 is a schematic block diagram of an entity capable of operating as a SIP client, in accordance with embodiments of the present invention;

FIG. 3 is a schematic block diagram of a mobile station that may operate as a SIP client, according to embodiments of the present invention;

FIG. 4A is a control flow diagram more particularly illustrating a method of pushing content to a terminal, in accordance with one embodiment of the present invention; and FIG. 4B is a control flow diagram more particularly illustrating a method of pushing content to a terminal, in accordance with another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of system that would benefit from the present invention is provided. The system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

As shown, the system 10 includes a public network 12, such as a public Internet Protocol (IP) network like the Internet. The public network includes a number of network nodes, each of which typically comprise a processing element such as a server computer, personal computer, laptop computer or the like. More particularly, the public network can include one or more network nodes comprising fixed terminals 14, each of which are capable of communicating within or across the public network. The network nodes of the public network 12 can also include a proxy 16, such as Session Initiation Protocol (SIP) proxy. Although not shown, the network nodes of the public network can also include a SIP registrar. In this regard, the registrar can be implemented in the SIP proxy, as is well known to those skilled in the art. As will be appreciated, calling models such as SIP provide an application layer signaling protocol related to multimedia sessions (see, e.g., IETF request for comment document RFC 3261, entitled: SIP: Session Initiation Protocol, June 2002, the contents of which are hereby incorporated by reference in its entirety). The SIP proxy is therefore capable of receiving and forwarding SIP signaling messages, such as SIP signaling messages to and/or from a network node comprising a fixed terminal operating as an originating node 20, as such is described in greater detail below. The public network can also include one or more Domain Name System (DNS) servers 18. In this regard, each network node typically has a unique IP address that has an associated, typically easier to recall, host DNS name. The DNS servers, then, can be capable of transforming a host DNS name into the associated IP address such that network traffic can be routed to the appropriate network node.

In addition to the public network 12, the system 10 includes one or more private networks 24, such as Local Area Networks (LANs). Each private network, like the public network, can include a number of network nodes. Also, like the public network 12, the network nodes of each private network can include one or more DNS servers 26. Similar to before, the DNS servers of the private networks can be capable of transforming a host DNS name into an associated IP address such that network traffic can be routed to the appropriate public or network node. The private network can also include one or more network nodes comprising mobile terminals 32, each of which are capable of communicating within or across the private network. The terminals 32 can comprise, for example, mobile telephones, portable digital assistants (PDAs), pagers, laptop computers, smart cards and other types of electronic systems.

To facilitate the terminals 32 accessing the private network, the private network 24 can include one or more wireless access points (AP's) (not shown), each of which can be coupled to one or more terminals. In this regard, the AP's can comprise access points configured to communicate with the terminal in accordance techniques such as, for example, radio frequency (RF), Bluetooth (BT), infrared (IrDA) or any of a number of different wireline and/or wireless networking techniques, including LAN and/or WLAN techniques. Also like the public network, the private network can include an originating node 20, which is described in greater detail below. As described below, the private network can include a terminating node 36, which can be capable of communicating with an originating node. And as also described below, one or more of the terminals of the private network can be capable of operating as an originating node or a terminating node.

To facilitate communications between network nodes of the public network 12 and network nodes of the private networks 24, each private network can further include a Network Address Translator (NAT) interconnecting the public network and the private network. As explained above in the background section, each NAT can be capable of transforming a public IP address from the public network into a private IP address of a network node of a respective private network, and vice versa, for communications between the public network and the respective private network. As will be appreciated, the NAT can also include an Application Level Gateway (ALG) (not shown) capable of transforming IP addresses embedded in, for example, application protocol data units (PDUs). In addition, the NAT can include or be associated with a firewall and/or gateway for the respective private network. As shown, then, a NAT including or associated with a firewall/gateway is shown as a NAT/FW 28.

The system 10 can also include one or more mobile or cellular networks 30. The cellular networks can comprise one or more of a number of different mobile networks. In this regard, the cellular networks can comprise any of a number of first-generation (1G), second-generation (2G), 2.5G and/or third-generation (3G) cellular networks, and/or any of a number of other cellular networks capable of operating in accordance with embodiments of the present invention. For example, each cellular network can comprise a GSM (Global System for Mobile Communication), IS-136 (Time Domain Multiple Access—TDMA), IS-95 (Code Division Multiple Access—CDMA), or EDGE (Enhanced Data GSM Environment) network. Alternatively, one or more of the cellular networks can comprise GPRS (General Radio Packet Service) or GPRS-based (e.g., Universal Mobile Telecommunications System—UMTS) networks.

Like the public and private networks 12, 24, the cellular networks 30 also include one or more network nodes. In this regard, the network nodes of each cellular network can include one or more mobile terminals 32 capable of communicating within and/or across a respective cellular network. And as described below, one or more of the mobile terminals are capable of operating as an originating node 20, such as in the same manner as the originating nodes of the public and private networks. In addition, as also described below, one or more of the mobile terminals are capable of operating as a terminating node 38 which, as indicated above and described below, can be capable of communicating with an originating node via a SIP proxy 16 in accordance with SIP.

Within the cellular networks 30, the network nodes can also include one or more network signaling support nodes such as one or more SGSNs (signaling GPRS support nodes) 38, and one or more gateway support nodes such as one or more GGSNs (gateway GPRS support nodes) 40. For example, the network nodes can include one or more SGSNs and one or more GGSNs, as such are described in a number of specifications of the 3G Partnership Project (3GPP). As will be appreciated by those skilled in the art, the SGSNs are capable of routing communications to and from the mobile terminals 32, and can also provide a connection to the other network nodes when the terminals are involved in a communication session with such network nodes. The GGSNs, on the other hand, are capable of interconnecting the cellular networks and the private networks 24. In this regard, the GGSNs are capable of performing traditional gateway actions, as such are well known. It should be noted that although the cellular networks can include SGSNs and GGSNs, the cellular networks can comprise other similarly operating network nodes for other types of cellular networks.

Reference is now made to FIG. 2, which illustrates a block diagram of an entity capable of operating as a network node (e.g., SIP proxy 16, originating node 20, NAT/FW 28, terminating node 36, SGSN 38, GGSN 40, etc.) within the public network 12, private networks 24 or cellular networks 30, in accordance with one embodiment of the present invention. Although shown as separate entities, in some embodiments, one or more entities may support one or more of the network nodes, logically separated but co-located within the entit(ies). For example, a single entity may support a logically separate, but co-located, originating node and SIP proxy. Also, for example, as indicated above, a single entity may support a logically separate, but co-located NAT and firewall/gateway.

As shown, the entity capable of operating as a network node can generally include a controller 42, processor or the like connected to a memory 44. The controller can also be connected to at least one interface 46 or other means for transmitting and/or receiving data, content or the like. The memory can comprise volatile and/or non-volatile memory, and typically stores content, data or the like. For example, the memory typically stores software applications, instructions or the like for the controller to perform steps associated with operation of the entity in accordance with embodiments of the present invention. Also, for example, the memory typically stores content transmitted from, or received by, the network node.

FIG. 3 illustrates a functional diagram of a mobile station that may operate as a mobile terminal 32 and, as such, an originating node 20 or terminating node 36, according to embodiments of the invention. It should be understood, that the mobile station illustrated and hereinafter described is merely illustrative of one type of mobile terminal that would benefit from the present invention and, therefore, should not be taken to limit the scope of the present invention. While several embodiments of the mobile station are illustrated and will be hereinafter described for purposes of example, other types of mobile terminals, such as portable digital assistants (PDAs), pagers, laptop computers and other types of voice and text communications systems, can readily employ the present invention.

The mobile station includes a transmitter 48, a receiver 50, and a controller 52 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of 1G, 2G, 2.5G and/or 3G communication protocols or the like. For example, the mobile station may be capable of operating in accordance with 2G wireless communication protocols IS-136 (TDMA), GSM, and IS-95 (CDMA). Also, for example, the mobile station may be capable of operating in accordance with 2.5G wireless communication protocols GPRS, Enhanced Data GSM Environment (EDGE), or the like. Some narrow-band AMPS (NAMPS), as well as TACS, mobile stations may also benefit from embodiments of the present invention, as should dual or higher mode mobile stations (e.g., digital/analog or TDMA/CDMA/analog phones).

It is understood that the controller 52 includes the circuitry required for implementing the audio and logic functions of the mobile station. For example, the controller may be comprised of a digital signal processor device, a microprocessor device, and various analog to digital converters, digital to analog converters, and other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 52A, and may include an internal data modem (DM) 52B. Further, the controller may include the functionally to operate one or more software applications, which may be stored in memory.

The mobile station also comprises a user interface including a conventional earphone or speaker 54, a ringer 56, a microphone 60, a display 62, and a user input interface, all of which are coupled to the controller 52. The user input interface, which allows the mobile station to receive data, can comprise any of a number of devices allowing the mobile station to receive data, such as a keypad 64, a touch display (not shown) or other input device. In embodiments including a keypad, the keypad includes the conventional numeric (0-9) and related keys (#, *), and other keys used for operating the mobile station.

Although not shown, the mobile station can further include an IrDA transceiver or another local data transfer device so that data can be shared with and/or obtained from other devices such as other mobile stations, car guidance systems, personal computers, printers, printed materials including barcodes and the like. The sharing of data, as well as the remote sharing of data, can also be provided according to a number of different techniques. For example, the mobile station may include a RF transceiver capable of sharing data with other radio frequency transceivers, and/or with a Radio Frequency Identification (RFID) transponder tag, as such is known to those skilled in the art. Additionally, or alternatively, the mobile station may share data using BT brand wireless technology developed by the Bluetooth Special Interest Group. Further, the mobile station may be capable of sharing data in accordance with any of a number of different wireline and/or wireless networking techniques, including LAN and/or WLAN techniques.

The mobile station can also include memory, such as a subscriber identity module (SIM) 66, a removable user identity module (R-UIM) or the like, which typically stores information elements related to a mobile subscriber. In addition to the SIM, the mobile station can include other memory. In this regard, the mobile station can include volatile memory 68, as well as other non-volatile memory 70, which can be embedded and/or may be removable. For example, the other non-volatile memory can comprise embedded or removable multimedia memory cards (MMCs), Memory Sticks manufactured by Sony Corporation, EEPROM, flash memory, hard disk or the like. The memories can store any of a number of pieces of information, and data, used by the mobile station to implement the functions of the mobile station. For example, the memories can store an identifier, such as an international mobile equipment identification (IMEI) code, international mobile subscriber identification (IMSI) code, mobile station integrated services digital network (MSISDN) code or the like, capable of uniquely identifying the mobile station. The memories can also store content, such as that to transmit to, or that received from, an originating node 20.

As indicated in the background section, conventional techniques for permitting an originating node 20, to push content to a terminating node 36, such as a mobile terminal, ignore the limitations of the public domains like the public network 12 (e.g., Internet) that lead to the use of the NAP/FW 28 to interconnect the public network to a respective private network 24. Namely, such techniques ignore the limitation of available public IP addresses. Also, such a technique ignores the ability of the NAP/FW to provide firewall and/or gateway functionality to a respective private network. Thus, embodiments of the present invention provide an improved system and method for pushing content to a terminating node, where the terminating node resides in a private or cellular (i.e., mobile network). More particularly, embodiments of the present invention provide a system and method that permit originating nodes to push content to terminating nodes utilizing a network-initiated data session technique that accounts for the limited address space of public domains. In addition, the system and method can, but need not, permit originating nodes to push content to terminating nodes while maintaining firewall and/or gateway functionality to the mobile network.

As described below, the originating node initiates communication with a terminating node comprising a terminal within a cellular network 30. It should be understood, however, that the terminating node can alternatively comprise a network node of a private network, without departing from the spirit and scope of the present invention.

As well known to those skilled in the art, SIP is an application-layer control protocol that can establish, modify and terminate multimedia sessions or calls. SIP is text-based, using ISO 10646 in UTF-8 encoding throughout. The syntax of the messages is similar to HTTP, except that SIP can carry the transaction using either User Datagram Protocol (UDP) or Transmission Control Protocol (TCP). A SIP message can typically be characterized as either a request or a response, and it can be created following the format of Internet Engineering Task Force (IETF) request for comment document RFC 822, entitled: Standard for the Format of ARPA Internet Text Messages, August 1982, the contents of which are hereby incorporated by reference in its entirety.

Generally, the entities involved in a SIP session include a user agent (e.g., originating node 20, terminating node 36, etc.), the SIP proxy 16, a registrar and a location service. The user agent can function as a client (UAC) that initiates a SIP request. The user agent can also operate as a server (UAS) that contacts the user when a SIP request is received, and sends back a response on behalf of the user. The SIP proxy, as indicated above, comprises an intermediate entity that can simultaneously function like a client and server. In this regard, the SIP proxy can interpret and modify a SIP request before forwarding it to other servers. The registrar which, as shown, can be implemented in the SIP proxy, accepts user registrations (e.g., REGISTER messages) and can make this information available through a location service, also capable of being implemented in the SIP proxy. The location service, then, comprises an element used by the SIP proxy to obtain information about the possible location of a terminating node.

A SIP message generally comprises a start line, one or more header fields, an empty line (carriage-return line-feed—CRLF) and an optional body. Generally, the start line of a SIP message indicates if the message is a request (e.g., INVITE, ACK, OPTIONS, BYE, CANCEL, REGISTER, REFER, etc.) or a response (e.g., 100 Informational, 200 Success, 300 Redirection, 400 Client Error, 500 Server Error, 600 Global Failure, etc.). The message header can include multiple headers indicating, for example, the source ("From:"), destination ("To:"), call identifier ("Call-ID:"), message sequence ("Cseq:"), contact ("Contact:"), transaction path ("Via:"), length ("Content-Length:") and content ("Content-Type:") of the body, if carried in the message. The message body, on the other hand, can include any of a number of different types of data, the interpretation of which typically depends upon the type of message. Generally, the content of the body can contain a session description following a specific format such as the Session Description Protocol (SDP), text or Extensible Markup Language (XML) scripts. In this regard, the "Content-Type" header field gives the media type of the message body. If the body is encoded, such encoding is typically indicated in the "Content-Encoding" header field, and the body length is typically given in the "Content-Length" header field.

The entities addressed by SIP can include users that can be accessed via SIP proxies 16 supporting such users, where the users can be identified by a SIP uniform resource locator (URL). Generally, SIP URLs are used within SIP messages to indicate, for example, the originator (From), the current destination in the start line (request URL), and the final recipient (To) of a SIP request. As will be appreciated, the URL can take a form such as "user@host," where "user" typically identifies a user (e.g., user name, telephone number, etc.) and "host" identifies a SIP proxy (e.g., domain name, IP address, etc.) supporting the user. In this regard, SIP URLs can be used for locating a user based upon a domain name-to-IP address translation by a DNS server 18, particularly when the URL includes the domain name of the respective SIP proxy. In this regard, the originator can query the DNS server including the destination address including the domain name of the SIP proxy.

As indicated above, the system 10 can include an originating node 20 and a terminating node 36. Generally, the terminating node is capable of subscribing to a push service, such as a SIP push service, of the originating node such that the originating node can thereafter push content to the terminating node via a SIP proxy 16 supporting the terminating node. As well known to those skilled in the art, the SIP proxy can be capable of forwarding SIP signaling messages to the terminating node from the originating node, and vice versa. In contrast to conventional SIP communication techniques, however, when the terminating node is located behind a NAT/FW 28 from the originating node, the SIP proxy may not be capable of identifying the terminating node across the NAT/FW when the originating node desires to initiate a SIP communication session with the terminating node. More particularly, for example, the SIP proxy may not be capable of identifying the terminating node when the NAT/FW no longer maintains a translation table entry for the terminating node or the SIP proxy no longer maintains a registration for a public IP address and port assigned by the NAT/FW to the terminating node.

In accordance with embodiments of the present invention, then, the terminating node 36 can be capable of instructing the SIP proxy 16 to subscribe to a push service of an originating node 20 on behalf of the terminating node. The originating node can then provide the push service to the SIP proxy on behalf of the terminating node. In turn, the SIP proxy can utilize a network-initiated data session technique to communicate with the terminating node across the NAT/FW 28 to deliver the push content to the terminating node. The SIP proxy can utilize any of a number of different network-initiated data sessions with the terminating node to thereby initiate communication with the terminating node such that the SIP proxy can deliver the push content to the terminating node. For example, the SIP proxy can utilize a network-initiated data session technique in accordance with the Third Generation Partnership Project 2 (3GPP2) specification 3GPP2 S.P0090, entitled: Network-initiated Data Session (NIDS), the contents of which are hereby incorporated by reference in its entirety.

In another example, the SIP proxy 16 can be capable of sending a non-IP-based trigger to the terminating node 36 independent of the public and private networks 12, 24, to thereby instruct the terminating node to re-register with the SIP proxy, such as across the NAT/FW 28. In this regard, the SIP proxy can be capable of sending a short messaging service (SMS) message, enhanced messaging service (EMS) message, multimedia messaging service (MMS) message or Wireless Application Protocol (WAP) push trigger to the terminating node. In response to the trigger, the terminating node can re-register with the SIP proxy such that the SIP proxy can thereafter communicate with the terminating node across the NAT/FW. More particularly, in response to the trigger, the terminating node can register with the SIP proxy through the NAT/FW such that the NAT/FW assigns a public IP address to the terminating node, and such that the SIP proxy can register the terminating node including the assigned public IP address. As indicated above, the SIP proxy can implement a registrar in accordance with SIP to thereby carry out the functions of the registrar, such as to register the terminating node. As such, as described herein, it should be understood that the SIP proxy can comprise a SIP proxy implementing a corresponding registrar, such as to register and/or re-register the terminating node.

To permit the SIP proxy 16 to send a non-IP-based trigger to the terminating node 36, the SIP proxy is capable of identifying the terminating node independent of an IP communication channel of the public and private networks 12, 24, and thus over a communication channel independent of the NAT/FW 28. For example, the SIP proxy can be capable of identifying a MSISDN or other global identifier associated with a terminating node. Based upon the MSISDN, then, the SIP proxy can send a SMS, EMS, MMS or WAP-push trigger to the terminating node. In this regard, the SIP proxy can be capable of identifying a non-IP-based identifier of the terminating node in any of a number of different manners. In one advantageous embodiment, the terminating node registers with the SIP proxy before the SIP proxy receives push content from the originating node 20 for the terminating node. As the terminating node registers with the SIP proxy, then, the terminating node can send the SIP proxy an identifier (e.g., MSISDN) of the terminating node outside an IP communication channel. For more information on such a network-initiated data session technique, see U.S. patent application Ser. No. 10/797,765, entitled: System and Method for Establishing a Session Initiation Protocol Communication Session with a Mobile Terminal, filed Mar. 10, 2004, the contents of which are hereby incorporated by reference in its entirety. And for an example of another network-initiated data session technique, see U.S. patent application Ser. No. 10/797,529, entitled: System and Method for Establishing an Internet Protocol Connection with a Terminating Network Node, filed Mar. 10, 2004, the contents of which are also hereby incorporated by reference in its entirety.

Reference is now made to FIGS. 4A and 4B, which illustrate examples of a method of pushing content to a terminating node 36 in accordance with embodiments of the present invention. For purposes of the examples shown in FIGS. 4A and 4B, consider a terminating node that has a private IP address, and is capable of being identified by a user and a host domain name. Also, consider the terminating node having a MSISDN. In addition, for example, consider an originating node 20 and a SIP proxy 16, each having a public IP address. Further, consider a NAT/FW 28 being capable of assigning one or more IP addresses within a pool of IP addresses.

As shown in FIG. 4A, the terminating node 36 can instruct the SIP proxy 16 to subscribe to a push service of the originating node 20 on behalf of the terminating node by sending a SIP REFER message to the SIP proxy via a respective NAT/FW 28. As will be appreciated by those skilled in the art, the SIP REFER message can be utilized by the terminating node to request that the SIP proxy refer to a resource (i.e., push service of the originating node) identified in the REFER message, and to allow the terminating node to be notified of the outcome of the referenced request. For more information on the SIP REFER technique, see IETF request for comment document RFC 3515, entitled: The Session Initiation Protocol (SIP) Refer Method, April 2003, the contents of which are hereby incorporated by reference in its entirety.

The SIP REFER message can include any of a number of pieces of information, such as that described above. For example, header fields of the SIP REFER message can include a source identifying the private IP address of the terminating node 36. The header fields can also include, for example, a destination identifying the public IP address of the SIP proxy 16, and a contact identifying the user and domain name of the terminating node. In addition, the header fields can identify the originating node 20 in a refer header field ("Refer-To:") that also identifies the push service of the originating node and instructs the SIP proxy to subscribe (i.e., method=SUBSCRIBE) to the push service.

In response to the SIP REFER message, the NAT/FW 28 can create a new transformation table entry for the terminating node 36 associating the private IP address of the terminating node with a public IP address. If the NAT/FW currently has a transformation table entry for the terminating node with an assigned public IP address, however, the NAT/FW can lookup the transformation table entry for the terminating node. In addition to creating a new transformation table entry, to permit communications between the intermediate node and the NAT/FW, if so desired, the NAT/FW can also add a new firewall (FW) filter allowing communications from the NAT/FW and communications to the SIP proxy 16. Although not described herein, messages sent and/or received in accordance with embodiments of the present invention can also include an open communication port. In such instances, the NAT/FW can create transformation table entries further including the same or another communication port, and can further operate in a manner accounting for such communication port(s).

After creating a new transformation table entry, or looking up an existing transformation table entry, the NAT/FW 28 can transform the private IP address of the terminating node 36 in the header fields of the SIP REFER message into the public IP address assigned to the terminating node by the NAT/FW. Also, depending upon the operation of the ALG of the NAT/FW, a contact identifying the user and domain name of the terminating node can be translated to identify the public IP address assigned to the terminating node. Then, after transforming the address of the SIP REFER message, the NAT/FW can pass the transformed SIP REFER message to the SIP proxy 16.

Upon receiving the transformed SIP REFER message, the SIP proxy 16 can accept the SIP REFER message by returning an acceptance, such as a 202 (ACCEPTED) message, back to the terminating node 36 via the NAT/FW 28. In this regard, the 202 (ACCEPTED) message can identify the terminating node by the public IP address assigned to the terminating node by the NAT/FW. Upon receipt of the 202 (ACCEPTED) message, then, the NAT/FW can transform the assigned public IP address into the private IP address of the terminating node. The NAT/FW can then forward the 202 (ACCEPTED) message to the terminating node.

Also, because the SIP REFER message requests the SIP proxy 16 to enter a subscription on behalf of the terminating node 36, the SIP proxy can create a SIP subscription for the refer request of the terminating node. After creating the subscription, then, the SIP proxy can return a SIP NOTIFY message (i.e., NOTIFY (REFER)) to the terminating node to thereby notify the terminating node that the SIP proxy has created a subscription for the refer request of the terminating node. And as before, the SIP proxy can send the SIP NOTIFY message to the terminating node via the NAT/FW 28 by addressing the SIP NOTIFY message to the assigned public IP address of the terminating node. In turn, the NAT/FW can transform the public IP address assigned to the terminating node to the private IP address of the terminating node and forward the SIP NOTIFY message to terminating node. Then, in response to the SIP NOTIFY message, the terminating node can send an acknowledgement of the SIP NOTIFY, such as a 200 (OK) message, back to the SIP proxy via the NAT/

FW, which transforms the private IP address of the terminating node into the public IP address assigned to the terminating node by the NAT/FW.

Also upon receipt of the SIP REFER message, the SIP proxy 16 can process the SIP REFER message by subscribing to the push service of the originating node 20 on behalf of the terminating node 36 in accordance with the SIP REFER message. In this regard, the SIP proxy can send a SIP SUBSCRIBE message to the originating node to thereby subscribe to the push service of the originating node. The SIP SUBSCRIBE message can include any of a number of different pieces of information, but in accordance with the SIP REFER message, identifies the push service identified in the SIP REFER message. In addition, because the SIP proxy is subscribing to the push service on behalf of the terminating node, the SIP SUBSCRIBE message typically identifies the SIP proxy, as opposed to the terminating node.

Upon receipt of the SIP SUBSCRIBE message, the originating node 20 can acknowledge receipt of the SIP SUBSCRIBE message, such as by returning a 200 (OK) message to the SIP proxy 16. In addition, the originating node can create a subscription to the push service for the SIP proxy. After creating the subscription, the originating node can return a SIP NOTIFY message (i.e., NOTIFY (SUBSCRIBE)) to the SIP proxy to thereby notify the SIP proxy that the originating node has created a subscription to the push service of the originating node for the SIP proxy. Upon receipt of the SIP NOTIFY message, the SIP proxy, in accordance with the refer subscription, can notify the terminating node 36 of the successful subscription. In this regard, the SIP proxy can send a SIP NOTIFY message (i.e., NOTIFY (REFER)) to the terminating node via the NAT/FW 28 by, as before, addressing the SIP NOTIFY message to the assigned public IP address of the terminating node. Also as before, the NAT/FW can transform the public IP address assigned to the terminating node to the private IP address of the terminating node. Further, the terminating node can send a 200 (OK) message back to the SIP proxy via the NAT/FW.

At one or more points in time after the SIP proxy 16 has successfully subscribed to the push service of the originating node 20 on behalf of the terminating node 36, the terminating node can receive push content from the originating node via the SIP proxy and in accordance with the push service. In this regard, in accordance with the subscription to the push service, the originating node can send a SIP NOTIFY message (i.e., NOTIFY (INC. CONTENT)) to the SIP proxy including push content. As before, upon receipt of the SIP NOTIFY message, the SIP proxy can return a 200 (OK) message to the originating node. Also, upon receipt of the push content, the SIP proxy can forward the push content to the terminating node 36 via the NAT/FW 28 in accordance with the refer subscription entered by the SIP proxy for the terminating node.

In various instances, such as after a "time-to-live" period, however, the NAT/FW 28 may remove the translation table entry for the terminating node 36. Additionally, or alternatively, for example, the SIP proxy 16 may cease to maintain the registration entry for the terminating node, including the public IP address assigned to the terminating node by the NAT/FW. Further, the terminating node can de-register from the SIP proxy, and thereafter enter an "idle" operating state. In any of those instances, as will be appreciated, the SIP proxy may not be capable of identifying the terminating node across the NAT/FW to thereby forward push content to the terminating node via the NAT/FW.

In accordance with embodiments of the present invention, then, upon receipt of the push content, the SIP proxy 16 can buffer the push content from the originating node 20, such as into a memory (e.g., memory 44) of the SIP proxy. Thereafter, the SIP proxy can establish a network-initiated data session with the terminating node 36. For example, the SIP proxy 16 can send a non-IP-based trigger to the terminating node based upon a non-IP-based identifier of the terminating node, such as a MSISDN. The non-IP-based trigger, in turn, can instruct the terminating node to re-register with the SIP proxy. For example, the SIP proxy can send a SMS message, EMS message, MMS message or WAP-push trigger to the terminating node across the cellular network 30 independent of the public and private networks 12, 24, and thus the NAT/FW.

In response to the SIP proxy 16 establishing a network-initiated data session with the terminating node 36, the terminating node can re-register with the SIP proxy such that the NAT/FW 28 can again assign a public IP address and communication port to the terminating node, and the SIP proxy can update its registration entry for the terminating node. More particularly, for example, once the terminating node receives the trigger, the terminating node can send a SIP REGISTER message to the SIP proxy via a respective NAT/FW. In response to the SIP REGISTER message, the NAT/FW can again create a new transformation table entry for the terminating node associating the private IP address of the terminating node with a public IP address.

After creating a new transformation table entry, the NAT/FW 28 can transform the private IP address of the terminating node 36 in the SIP REGISTER message into the public IP address assigned to the terminating node by the NAT/FW. Then, the NAT/FW can pass the transformed SIP REGISTER message to the SIP proxy 16 for registration. Upon receiving the transformed register message, the SIP proxy can update the previous registration entry for the terminating node. Then, the SIP proxy can confirm reception and creation/updating of the registration entry. As before, for example, the SIP proxy can send a 200 (OK) message to the terminating node via the NAT/FW 28.

After re-registering the terminating node 36, the SIP proxy 16 can forward the push content to the terminating node via the NAT/FW 28, such as within a SIP MESSAGE. For more information on a technique for sending such a message, see IETF request for comment document RFC 3428, entitled: Session Initiation Protocol (SIP) Extension for Instant Messaging, December 2002, the contents of which are hereby incorporated by reference in its entirety. In this regard, from the SIP proxy, the NAT/FW can receive the push content and lookup the transformation table entry for the terminating node based upon the assigned public IP address of the terminating node (identified as the destination of the push content). The NAT/FW can then transform the destination of the push content from the assigned public IP address to the private IP address of the terminating node. After transforming the destination of the push content, the NAT/FW can forward the push content to the terminating node based upon the private IP address of the terminating node. Then, although not shown, the terminating node can confirm reception of the push content, such as by sending a 200 (OK) message to the SIP proxy via the NAT/FW.

In lieu of the SIP proxy 16 storing the push content in a buffer and forwarding the push content to the terminating node 36, the terminating node can be configured such that after re-registering with the SIP proxy, the terminating node subscribes to the push service to thereby receive the push content. In this regard, reference is now drawn to FIG. 4B which illustrates a portion of a method of pushing content to a terminating node in accordance with another embodiment of the present invention. As shown in FIG. 4B, as before, after the SIP proxy has successfully subscribed to the push service of the originating node 20 on behalf of the terminating node, the originating node can send, to the SIP proxy, a SIP NOTIFY message (i.e., NOTIFY (INC. CONTENT)) that includes push content in accordance with the push service. Also as before, in response to the SIP NOTIFY message, the SIP proxy can return a 200 (OK) message to the originating node. Thereafter, the SIP proxy can establish a network-initiated data service with the terminating node, such as by sending a non-IP-based trigger to the terminating node. Then, as before, the terminating node can re-register with the SIP proxy via the NAT/FW 28 such that the NAT/FW can again assign a public IP address and communication port to the terminating node, and the SIP proxy can update its registration entry for the terminating node.

After re-registering with the SIP proxy 16, the terminating node 36 can subscribe to the push service of the originating node 20 such that the terminating node can receive the push content from the originating node, as opposed to from a buffer of the SIP proxy, as shown in FIG. 4A. In this regard, by configuring the terminating node to instruct the SIP proxy to subscribe to the push service on behalf of the terminating node and thereafter subscribe to the push service after the SIP proxy receives push content, the terminating node need only to occupy network resources during periods of time when the originating node sends push content in accordance with the push service.

As shown, the terminating node 36 can subscribe to the push service by sending a SIP SUBSCRIBE message to the originating node 20 via the NAT/FW 28 and the SIP proxy 16, as shown in FIG. 4B. More particularly, the terminating node can send a SIP SUBSCRIBE message, as before, that identifies the push service of the originating node and identifies the terminating node, typically identifying the private IP address of the terminating node. The NAT/FW can then receive the SIP SUBSCRIBE message, lookup the transformation table entry for the terminating node, and thereafter transform the private IP address of the terminating node in the SIP SUBSCRIBE message into the public IP address assigned to the terminating node by the NAT/FW. After transforming the private IP address of the terminating node into the assigned public IP address, the NAT/FW 28 can forward the SIP SUBSCRIBE message to the SIP proxy. The SIP proxy, in turn, can forward the SIP SUBSCRIBE message to the originating node.

Upon receipt of the SIP SUBSCRIBE message, as before, the originating node 20 can acknowledge receipt of the SIP SUBSCRIBE message, such as by returning a 200 (OK) message to the terminating node 36 via the SIP proxy 16 and the NAT/FW 28, which transforms the private IP address of the terminating node into the public IP address assigned to the terminating node. In addition, the originating node can create a subscription to the push service for the terminating node. After creating a subscription to the push service for the terminating node, the originating node can send a SIP NOTIFY message to the terminating node via the SIP proxy and NAT/FW. As before, the SIP NOTIFY message can include push content in accordance with the subscription to the push service. In this regard, the SIP NOTIFY message can comprise the same SIP NOTIFY message received by the SIP proxy before the SIP proxy established the network-initiated data service with the terminating node, although the SIP NOTIFY message now received by the terminating node via the SIP proxy and NAT/FW identifies the terminating node as the destination of the message. Upon receipt of the SIP NOTIFY message including the push content, then, the terminating node can return a 200 (OK) message to the originating node via the NAT/FW and SIP proxy.

As described herein, the terminating node 36 is located behind a NAT/FW 28 from an originating node 20. It should be appreciated, however, that the terminating node can be located behind a firewall/gateway (FW) without a NAT between the terminating node and the originating node. In such instances, embodiments of the present invention can be capable of permitting the originating node to initiate communication with the terminating node in instances in which the communication may otherwise be restricted by the FW, thereby maintaining the firewall and/or gateway functionality to the network including the terminal.

For example, as will be appreciated by those skilled in the art, a system 10 including a NAT for private/public address translation is typical of networks communicating in accordance with IP Version 4 (IPv4). It should be understood, however, that the system, or portions thereof, can alternatively be configured to communicate in accordance with IP Version 6 (IPv6), which supports longer IP addresses than IPv4. In this regard, because IPv6 supports longer IP addresses than IPv4, one or more of the private networks may not require a NAT to perform address/port translations. In such instances, the system may not include a NAT or NAT/FW, but instead includes a firewall/gateway (FW) capable of operating as a security mechanism to an associated private network, such as in the same manner as described above. The system can then operate as described above, although the terminating node can have an associated public IPv6 address. As such, the source or destination of communications between the originating node and the terminating node, that otherwise identifies an assigned public IPv4 address of the terminating node that is translated by a NAT into a private IPv4 address, can identify the public IPv6 address of the terminating node and pass without translation from a public IPv4 address to a private IPv4 address or vice versa.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
generating a request for a subscription to a push service over a first network on behalf of a terminal in a second network to obtain push content;
initiating establishment of a data session with the terminal via a network address translator or a firewall in response to receiving the request;
registering a network address assigned to the terminal associated with the first network in accordance with establishment of the data session;
causing, at least in part, transmission of the push content over the first network and via the network address translator or the firewall to the terminal;
causing, at least in part, transmission of a trigger to the terminal over a communication channel independent of the network address translator or the firewall, in response to receiving subsequent push content in accordance with the push service;
re-registering the terminal after the transmission of the trigger; and causing, at least in part, transmission of the subsequent push content over the first network and via the network address translator or the firewall to the terminal based upon the re-registration.

2. A method according to claim 1, wherein at least one of removal of the terminal from a translation table of the network address translator or the firewall, removal of the terminal from the registration, de-registration initiated by the terminal, and entry by the terminal into an idle mode, occurs prior to the re-registration.

3. A method according to claim 1, further comprising:
causing, at least in part, transmission of subsequent push content through the network address translator or the firewall to the terminal based upon direct subscription to the push service by the terminal, the direct subscription occurring after the re-registration.

4. A method according to claim 1, further comprising:
causing, at least in part, reception of the push content from the push service, before or after registering the network address assigned to the terminal.

5. A method according to claim 3, further comprising:
causing, at least in part, reception of the subsequent push content from the push service, before re-registering the terminal.

6. A method according to claim 1, wherein the push service is originated from the first network or a third network connected to the first network via another network address translator or another firewall.

7. A method according to claim 1, wherein the trigger includes a short messaging service, enhanced messaging service, multimedia messaging service, or wireless application protocol-push message.

8. A method according to claim 1, wherein the trigger includes a globally unique identifier of the terminal.

9. An apparatus comprising:
at least one processor; and
at least one memory including computer program code, the at least one memory and the computer program code configured to, with the at least one processor, cause the apparatus to perform at least the following,
generate a request for a subscription to a push service over a first network on behalf of a terminal in a second network to obtain push content,
initiate establishment of a data session with the terminal via a network address translator or a firewall in response to receiving the request,
register a network address assigned to the terminal associated with the first network in accordance with establishment of the data session,
transmit the push content over the first network and via the network address translator or the firewall to the terminal,
transmit a trigger to the terminal over a communication channel independent of the network address translator or the firewall, in response to receiving subsequent push content in accordance with the push service,
re-register the terminal after the transmission of the trigger, and
transmit the subsequent push content over the first network and via the network address translator or the firewall to the terminal based upon the re-registration.

10. An apparatus of claim 9, wherein at least one of removal of the terminal from a translation table of the network address translator or the firewall, removal of the terminal from the registration, de-registration initiated by the terminal, and entry by the terminal into an idle mode, occurs prior to the re-registration.

11. An apparatus of claim 9, wherein the apparatus is further caused to:
transmit subsequent push content through the network address translator or the firewall to the terminal based upon direct subscription to the push service by the terminal, the direct subscription occurring after the re-registration.

12. An apparatus of claim 9, wherein the apparatus is further caused to:
receive the push content from the push service, before or after registering the network address assigned to the terminal.

13. An apparatus of claim 11, wherein the apparatus is further caused to:
receive the subsequent push content from the push service, before re-registering the terminal.

14. An apparatus of claim 9, wherein the apparatus comprises a session initiation protocol (SIP) proxy, the first network is a public network, and the second network is a private network.

15. A non-transitory computer-readable storage medium carrying one or more sequences of one or more instructions which, when executed by one or more processors, cause an apparatus to at least perform the following steps:
generating a request for a subscription to a push service over a first network on behalf of a terminal in a second network to obtain push content;
initiating establishment of a data session with the terminal via a network address translator or a firewall in response to receiving the request;
registering a network address assigned to the terminal associated with the first network in accordance with establishment of the data session;
transmitting the push content over the first network and via the network address translator or the firewall to the terminal;
transmitting a trigger to the terminal over a communication channel independent of the network address translator or the firewall, in response to receiving subsequent push content in accordance with the push service;
re-registering the terminal after the transmission of the trigger; and
transmitting the subsequent push content over the first network and via the network address translator or the firewall to the terminal based upon the re-registration.

16. A non-transitory computer-readable storage medium of claim 15, wherein at least one of removal of the terminal from a translation table of the network address translator or the firewall, removal of the terminal from the registration, de-registration initiated by the terminal, and entry by the terminal into an idle mode, occurs prior to the re-registration.

17. A non-transitory computer-readable storage medium of claim 15, wherein the apparatus is caused to further perform:
transmitting subsequent push content through the network address translator or the firewall to the terminal based upon direct subscription to the push service by the terminal, the direct subscription occurring after the re-registration.

* * * * *